United States Patent [19]

Brodnyan et al.

[11] Patent Number: 5,328,952
[45] Date of Patent: Jul. 12, 1994

[54] MULTI-STAGE POLYMER LATEX CEMENT MODIFIER AND PROCESS OF MAKING

[75] Inventors: John G. Brodnyan, Langhorne; Shang-Jaw Chiou, Lower Gwynedd; Mark P. de Grandpre, North Wales, all of Pa.

[73] Assignee: Rohm and Haas Company, Philadelphia, Pa.

[21] Appl. No.: 837,196

[22] Filed: Feb. 14, 1992

[51] Int. Cl.$^5$ .................. C08F 2/22; C08F 265/02; C08K 5/10; C04B 24/06
[52] U.S. Cl. .................. 525/301; 525/302; 525/311; 525/312; 525/902
[58] Field of Search ............ 525/301, 902, 523, 301.5, 525/302, 311, 312

[56] References Cited

U.S. PATENT DOCUMENTS

| | | | |
|---|---|---|---|
| 4,325,856 | 4/1982 | Ishikawa | 523/201 |
| 4,876,313 | 10/1989 | Lorah | 525/281 |
| 4,916,171 | 4/1990 | Brown et al. | 523/161 |
| 4,942,201 | 7/1990 | Briggs et al. | 525/71 |
| 4,948,822 | 8/1990 | Iovine et al. | 523/201 |
| 5,112,691 | 5/1992 | Briggs et al. | 428/412 |
| 5,149,729 | 9/1992 | Englund | 524/366 |

*Primary Examiner*—James J. Seidleck
*Assistant Examiner*—Patrick R. Delaney
*Attorney, Agent, or Firm*—Marvin J. Powell; Marc S. Adler

[57] ABSTRACT

Multi-stage polymer process and composition having an alkali-insoluble emulsion polymer and an alkali-soluble polymer are produced by a two-stage sequential emulsion polymerization process. When the multi-stage polymers of this invention are utilized as cement modifiers, improvements in cement mortar physical properties are realized.

10 Claims, No Drawings

5,328,952

MULTI-STAGE POLYMER LATEX CEMENT MODIFIER AND PROCESS OF MAKING

FIELD OF THE INVENTION

This invention relates to multi-stage polymers produced by a two-stage aqueous emulsion polymerization process. The multi-stage polymers of the present invention are particularly useful as modifiers for cementitious materials. The multi-stage polymers of this invention have excellent physical properties and, when used as a cement modifier, provide strength and adhesion to a variety of substrates while maintaining other properties such as tensile, flexural and compressive strength of the modified cement.

BACKGROUND OF THE INVENTION

It is known that multi-stage emulsion polymers made significant improvements over previous mixtures and blends such as described in U.S. Pat. No. 4,916,171. By polymerizing one component in the presence of another to form a multi-stage polymer, improvements in stability, rheology and water resistance were realized.

It is still further known that the addition of an acrylic polymer into cement mixtures improves mortar properties such as strength and adhesion of the mortar to a variety of substrates such as cement, wood and polystyrene form. However, while the addition of multi-stage emulsion polymers have made some improvement in strength and adhesion properties, further improvements are required.

General physical properties such as strength and adhesion of the mortar or modified cementitious material generally coincides with the polymer stiffness, the glass transition temperature (Tg) and the minimum film forming temperature (MFFT). Generally, the higher the Tg and MFFT of the polymer used in cement mixtures, the greater the strength and adhesion of modified mixtures (Ohama, et al., *ACI Materials Journal*, vol. 88, pp. 56-61 (1991). MFFT is the temperature at which a latex polymer forms a continuous film. However, the disadvantage in employing a high Tg polymer as the modifier is the need for higher curing temperatures. A higher curing polymer is not a concern where elevated curing temperatures for the most part are obtainable. However, the need for higher curing temperatures significantly limits the use of high Tg polymers as modifiers during the autumn or early winter periods of the year. Lower ambient temperatures during these periods significantly limits the use of high Tg polymers. On the other hand, lower Tg latex polymers may be otherwise preferred since shorter curing times and lower curing temperatures make their use practicable during the winter and fall when ambient temperatures are lower.

Another inherent problem with the use of lower Tg polymers is the loss of strength and adhesion of the polymer-modified material. Therefore, what is required is a latex polymer that may be useful as a modifier for cementitious material well into the fall and early winter when ambient temperatures are generally cooler. The use of lower Tg polymers at lower temperatures must be obtained without adversely effecting strength and adhesion of the modified material.

In the further evaluation of multi-stage polymers as modifiers for cementitious materials, we found that compositional modification of the ionically-soluble polymer and the method for preparing the same provides an emulsion modifier for cementitious materials that cures at lower temperatures, while the strength and adhesion properties of the modified material is uncompromised. Also, the lower curing temperature is obtained without other properties of the polymer-modified material, such as, tensile strength being adversely effected.

The current invention discloses a novel multi-stage emulsion polymer produced by a sequential emulsion polymerization process that when used as a cement modifier improves physical properties, such as strength and adhesion, while other properties such as tensile, flexural and compressive strength of the cement are maintained.

DESCRIPTION OF THE PRIOR ART

Two-stage emulsion polymers are known to exist in many morphological forms which are determined by many factors including the relative hydrophilicity, miscibility and molecular weights of the first and second stage polymers. So-called "core-shell" polymers are formed when the second stage polymers form a "shell" or coating around a discrete domain or "core" of the first-stage polymer. Examples of such core-shell polymers are disclosed in U.S. Pat. No. 4,916,171, which is herein incorporated by reference. Also, U.S. Pat. No. 4,876,313 discloses the use of polyfunctional compounds to chemically graft or bond the shell to the core in order to improve the resulting film's properties such as stability, water resistance and rheology. U.S. Pat. No. 4,876,313 is by this reference herein incorporated.

"Inverse core-shell" emulsion polymers such as disclosed in U.S. Pat. No. 4,876,313 are also known. Inverse core-shell polymers are those where the second stage polymer becomes the core and is surrounded by the shell which is made as the first stage polymer. These inverse compositions can be formed when the first stage polymer is more hydrophilic than the second stage monomer (Lee and Ishikawa, "The Formation of Inverted Core-Shell Lattices", *J. Polymer Science*, vol. 21, pp 147-154 (1983)).

While multi-stage polymers have made significant improvements in such polymer properties such as chemical and water resistance, stability and rheology, additional improvements are required. Therefore, in order for the multi-stage polymers to be especially useful in cementitious formulations, it must be compatible with cement, it must possess bulk mortar curing capability without significantly retarding the curing process, and it must demonstrate excellent strength and adhesion to a variety of substrates while being useful at lower ambient curing temperatures.

It is therefore an object of the present invention to provide novel multi-stage emulsion polymers and a process for preparing the same that when employed in cooler ambient temperatures are compatible with cementitious materials, allows bulk mortar curing, and has excellent strength and thoughness while adhering to a variety of substrates.

SUMMARY OF THE INVENTION

The present invention provides a composition having an alkali-insoluble emulsion polymer stage and an alkali-soluble emulsion polymer stage. The multi-stage polymers of the present invention are prepared in a two-stage sequential emulsion polymerization process by forming in a first-stage a mixture of monomers, polymerizing the mixture of monomers to form an insoluble emulsion polymer, forming in a second stage a mixture of monomers having acid and hydroxy functionality, adding the second stage monomer mixture to the polymerized first stage monomers and polymerizing the second stage monomers to form an alkali-soluble emulsion polymer.

The multi-stage polymers of the present invention are particularly useful for improving the physical properties of cementitious materials.

DETAILED DESCRIPTION OF THE INVENTION

This invention relates to multi-stage polymers produced by a two-stage aqueous emulsion polymerization process and their subsequent use as a modifier for cementitious materials. By utilizing the process of this invention, a multi-stage polymer product is produced where the multi-stage polymers have an aqueous-insoluble polymer and an alkali-soluble polymer. It is the attachment or association between the alkali-insoluble polymer and the alkali-soluble polymer after dissolving the alkali-soluble polymer which is believed to provide stability to the multi-stage polymer and physical properties to the polymer-modified cementitious mixtures that were previously unrealized.

There are two techniques for preparing the multi-stage polymers of this invention. Technique (I) provides: forming a first stage mixture of monomers having an alkyl acrylate or methacrylate, styrene or substituted styrene and a hydroxyalkyl ester of a carboxylic acid or acrylamide or methacrylamide, methylolated acrylamide or methylolated methacrylamide, polymerizing the mixture to form the alkali-insoluble emulsion polymer, forming a second stage mixture of monomers having a carboxylic acid or anhydride in an alkyl acrylate or an alkyl methacrylate or styrene or substituted styrene, acrylamide or methacrylate or hydroxyalkylester of a carboxylic acid, adding the second stage monomer mixtures to the polymerized first stage monomers and polymerizing the second stage monomers to form an alkali-soluble emulsion polymer.

In an alternate variation of the current invention, Technique (II) provides emulsion polymerization of a first stage mixture of monomers having a carboxylic acid or anhydride and an alkyl acrylate or alkyl methacrylate or styrene or substituted styrene, acrylamide or methacrylate or hydroxyalkyl ester of a carboxylic acid, polymerizing the first stage monomer mixture to form an alkali-soluble emulsion polymer, forming a second stage mixture of monomers having an alkyl acrylate or methacrylate, styrene or substituted styrene and a hydroxyalkyl ester of a carboxylic acid or alkyl anhydride or methacrylamide, methylolated acrylamide or methacrylamide adding the second stage monomer mixture to the polymerized first stage monomers and polymerizing the second stage monomers to form an alkali-insoluble multi-stage polymer. Technique II is the inverse polymerization process.

As used herein, the term "stage" refers to the polymer formed during each sequence of polymerization. Each stage is also defined as being different from the immediate preceding and/or immediate subsequent stage by a difference of at least 0.1% by weight in monomer composition. The multi-stage polymers may be prepared by a variety of processes which are well known in the art, such as suspension, emulsion and dispersion polymerization. Preferably, the multi-stage polymers of this invention are prepared by emulsion polymerization.

There are two essential aspects of the multi-stage polymers of the current invention. One is the polymerization process used to produced the multi-stage polymers, while the other involves the compositional modification of the ionically-soluble emulsion polymer. We have unexpectedly found that when the soluble emulsion polymer is compositionally modified using a low Tg polymer and is polymerized by a two-stage sequential emulsion polymerization process and finally used as a cementitious modifier, the modified material cures at a lower temperature without degradation of the strength and adhesion of the polymer-modified material. More specifically we have found that by modifying the ionically-soluble polymer using hydroxy ethyl methacrylate (HEMA) lower curing temperatures of the modified material are obtainable. When HEMA was used in the ionically-soluble polymer at a minimum concentration level of about at least 5 percent, strength and adhesion of the polymer-modified material was not degraded when the modified material was cured at lower ambient temperatures.

We also found that a two-stage sequential emulsion polymerization process using the compositionally modified soluble polymer produced a multi-stage polymer that when employed as a cement modifier demonstrated compressive strength and adhesion, while maintaining the tensile strength of the modified cementitious material. The multi-stage polymers of this invention are preferably useful in cement compositions as emulsion polymer particles.

Suitable monofunctional monomers for the preparation of the insoluble and the soluble polymers of the present invention are selected from the group consisting of methyl acrylate, ethyl acrylate, butyl acrylate, 2-ethylhexyl acrylate, decyl acrylate, methyl methacrylate, ethyl methacrylate, hydroxyethyl methacrylate, hydroxypropyl acrylate, hydroxypropyl methacrylate, acrylonitrile, acrylic acid, methacrylic acid, itaconic acid, maleic acid, fumaric acid, acrylic anhydride, methacrylic anhydride, methylolated acrylamide and methylolated methacrylamide, methacrylamide, acrylamide, divinyl benzene, half esters of maleic acid, itaconic acid, fumaric acid, styrene, substituted styrene, vinyl acetate and other $C_1$-$C_{12}$ alkyl acrylates and methacrylates and the like.

The weight ratio of the insoluble polymer to the soluble polymer is preferably 90:10 to about 99:1, more preferably from about 92:8 to about 98:2, and most preferably from about 94:6 to about 96:4. Preferably, the insoluble polymer has a weight average molecular weight greater than about 100,000 and the soluble polymer has a molecular weight from about 2,500 to about 12,000 as determined by aqueous gel permeation chromatography on the hydrolyzed sample. Preferably, the glass transition temperature (Tg), calculated and determined by the "Fox Equation", of the insoluble polymer is from about −45 (minus) degrees centigrade to about 30 degrees centigrade, and the Tg of the soluble polymer is greater than about 30 degrees centigrade.

The insoluble polymer referred to hereinafter as the "first stage" is formed from a mixture of monomers having from about 90 to about 100 percent of alkyl acrylates or methacrylates and from about 0 to 10 percent of a carboxylic acid. Preferred levels are about 97 percent to about 100 percent of alkyl acrylates or methacrylates and from about 0 percent to about 3 percent of a carboxylic acid, based on the weight of the insoluble polymer. It should be noted that the insoluble polymer must have less than 10 percent by weight of monomers having alkali solubility such that it is insoluble in alkali.

Suitable monomers for use in preparing the soluble polymer of this invention includes those listed above for the preparation of the first stage. However, it is critical to the preparation of the multi-stage polymers of this invention that higher levels of acid-containing monomers are used in the soluble polymer than in the first stage polymer in order to induce alkali solubility. The soluble polymer hereinafter referred to as the "second stage" is formed from a mixture of monomers having from about 40 percent to about 80 percent of an alkyl acrylate or methacrylate and from about 5 percent to about 60 percent of a carboxylic acid and from about 5 percent to about 60 percent of a hydroxy ester of a carboxylic acid. Preferred levels of hydroxy ester of a carboxylic acid is from about 5 percent to about 30 percent by weight of the shell. The most preferred level of hydroxy ester of a carboxylic acid is 15 percent. Preferred levels of acid-containing monomers for the soluble polymer range from about 5 percent to about 30 percent by weight of the soluble polymer. The most preferred acid-containing monomers for use in preparing the second stage polymer is methacrylic acid (MAA). The most preferred hydroxyester of a carboxylic acid is hydroxylethyl methacrylate. Anhydrides, such as methacrylic anhydride, maleic anhydride, itaconic anhydride, and the like, may be use in place of the acid-containing monomers in the soluble polymer. Preferably, the second stage polymer has about 40 percent to about 80 percent by weight methyl methacrylate. The soluble polymer preferably has a weight average molecular weight of about 2,500 to about 12,000 as defined and determined by gel permeation chromatography.

Polyfunctional compounds having two or more sites of unsaturation, two or more extractable atoms or one or more sites of unsaturation and one or more abstractable atoms, such as described in U.S. Pat. No. 4,876,313, may also be used in this invention to chemically graft the insoluble polymers to the soluble polymers of this invention which, by this reference, is herein incorporated. Compounds such as glycidyl-containing vinyl monomers and vinyl isocyanates, and the like, described in U.S. Pat. No. 4,565,839, are not suitable as polyfunctional compounds for this invention because they do not work to chemically graft the insoluble to the soluble polymer in aqueous emulsion polymerizations.

The acid-containing second stage polymers of this invention may be neutralized with any kind of base. Bases that are particularly useful in neutralization of the second stage polymer are selected from the group consisting of ammonia, triethylamine, monoethanolamine, dimethylaminoethanol, sodium hydroxide and calcium hydroxide and all other Group IA and IIA hydroxides and the like. Based on equivalents of acid in the soluble polymer, 0.8 to about 1.5 equivalents of base are added to the second polymer, and more preferably about 0.9 to about 1.1 equivalents of base are added to neutralize and partially dissolve the soluble polymer so as to form a neutralized but insoluble polymer and an aqueous solution of neutralized soluble polymer. It is also possible to use multi-stage polymers of this invention without neutralization when the cementitious material is highly alkaline.

The second stage polymer may contain any chain-transfer agent or mixtures thereof to control molecular weight of the second stage polymer. Common transfer agents, or mixtures thereof, known in the art such as alkyl mercaptans, are employed to control molecular weight, preferably $C_1$-$C_6$ alkyl and alkyloxy mercaptans, and the like, at levels of about 0.1 percent to about 10 percent by weight.

Adjuvants useful in the preparation of the multi-staged polymer binder and/or in its subsequent use and which may be added during or subsequent to the polymerization reaction may include auxiliary surfactants; defoamers such as, for example, SURFYNOL 104E and Nopco NXZ used at a level from about 0.001% to about 0.1%, by weight based on the weight of the monomer mixture; levelling agents such as, for example, Sag® Silicone Antifoam 47 used at a level from about 0.001% to about 0.1%, by weight based on the weight of the monomer mixture; antioxidants such as, for example, diethylhydroxylamine and IRGANOX 1010 used at a level from about 0.001% to about 5%, by weight based on the weight of the monomer mixture; plasticizers such as, for example, FLEXOL® plasticizer; and preservatives such as, for example, KATHON® and PROXEL® GXL used at a level of 5-250 ppm.

The multi-stage polymers of this invention are particularly useful as modifiers for cement mortars. By admixing the multi-stage polymers made by the process of this invention with cementitious compositions, superior physical properties and performance characteristics are realized.

The examples which follow are intended to further illustrate the invention and should not be interpreted in any manner whatsoever to limit the scope of the present invention.

EXAMPLES

All quantities were in grams unless otherwise noted.

Example 1

Two-Stage Sequential Multi-stage Polymer Process

A first stage monomer emulsion containing the following materials was prepared:

| | |
|---|---|
| DI Water | 503.4 |
| SLS | 10.1 |
| Triton X-405 | 118.5 |
| butyl acrylate | 945.7 |
| methyl methacrylate | 688.6 |
| methacrylic acid | 24.9 |
| Rinse DI water | 40.3 |

Into a 5 liter, four neck, round-bottomed flask equipped with a stirrer, thermometer and reflux condenser was charged 1006.4 of DI (deionized) water which was then heated to 83°-86° C. in a nitrogen atmosphere. Concurrently, a cofeed solution of 1.66 of ammonium persulfate in 83.0 DI water was prepared.

With the kettle water at 83°-86° C., the following materials were charged to the kettle:

| | |
|---|---|
| Ammonium persulfate/DI H$_2$O | 5.8/19.9 |
| Acrylic polymer | 67.6 |
| (an acrylic latex at 41% solids) | |
| Rinse DI water | 20 |

Immediately after these charges, the first-stage monomer emulsion and the cofeed catalyst solution were added over a 180 minute period. A kettle temperature of 81°–84° C. was maintained by cooling as required.

When the monomer emulsion (including the 40.3 g. water rinse) and cofeed catalyst feeds were completed, the batch was held at temperature for about 30 minutes and then allowed to cool slowly to 65° C. The following solutions were then added: 1.0 g. of 70% aqueous t-butyl hydroperoxide in 10.1 g. DI water, 1.3 g. of a 1% solution of $FeSO_4.7H_2O$, and 0.7 g. SSF in 15.1 g. DI water. About 15 minutes later, still at >60° C., 1.0 g. of 70% aqueous t-butyl hydroperoxide in 10.1 g. DI water and 0.7 g. SSF in 15.1 g. DI water were added.

A second stage monomer emulsion (ME #2) was prepared as follows:

| | |
|---|---|
| DI Water | 43.7 |
| CO-436 | 6.0 |
| Triton X-405 | 6.2 |
| Methyl Methacrylate | 61.1 |
| Methacrylic Acid | 13.1 |
| Hydroxyethyl Methacrylate | 13.1 |
| 3-Mercaptopropionic acid | 1.7 |
| Rinse $H_2O$ | 13.1 |

At 60° C., the second stage monomer emulsion was charged to the kettle containing the first stage latex and allowed to stir for 15–20 minutes. To this mixture was added 1.73 g. t-BHP in 10.0 DI water, and 1.18 g. SSF in 26.2 g. DI water. An exotherm began within five minutes and increased the temperature by 1°–2° C. over 5–10 minutes. Fifteen minutes after reaching the peak temperature, 1.73 g. t-BHP in 10.0 g. DI water and 1.18 g. SSF in 26.2 g. DI water were added. The latex was then cooled to <50° C. and 5.2 g. sodium citrate in 26.6 g. DI water and 17.5 g. ethylene glycol were added. Then, 139.7 g. DI water was added. The completed latex was allowed to cool to ambient temperature and was filtered yielding a product with 47.0% solids, pH 2.9, BI-90 particle size 259 nm and Brookfield viscosity of 17 cps.

Example 2

Modification of Soluble Polymer in Example 1 Process

In this example, the second stage monomer emulsion was kept the same as in Example 1 except for changes in the methyl methylacrylate, methacrylic acid and hydroxyethyl methacrylate ratios to give second stages of:

(A) 60 MMA/15 MAA/25 HEMA (B) 60 MMA/25 MAA/15 HEMA

In addition, in another example methyl methacrylate was partially replaced by butyl acrylate to give a second stage of composition:

(C) 35 BA/35 MMA/15 MAA/15 HEMA

Example 3

Two-Stage Polymer Use in Portland Cement Modification

To a 3 sand/1 Portland Cement Type 1 blend sufficient latexes from Examples 1 and 2 were added to give a dry polymer to cement ratio of 0.10. Water and defoamer (Nopco NXZ) were added to give a water to cement ratio of 0.40 and a defoamer to cement ratio of 0.005. Using a Hobart mixer, a wet mortar of a density of 2.0 was made and from this mortar were cast: 2 inch mortar cubes for testing compression strength according to ASTM C-109-73, two 0.8×2×2 inch patches on concrete for testing shear bond adhesion, and briquette specimens for testing tensile strength according to ASTM C-190-72.

Excellent properties were obtained with latexes from Examples 1 and 2 (see Table 1). For comparison purposes, Table 1 includes a commercial all-acrylic copolymer latex that does not have second stage polymer.

TABLE 1

Effect of Soluble Polymer Tg and Functional Monomer Level on Mortar Performance

| Examples | Compression Strength (psi) | | | Shear Bond (psi) | | | Tensile Strength (psi) | | |
|---|---|---|---|---|---|---|---|---|---|
| | 7D | 14D | 7Dry & 7W | 7D | 14D | 7Dry & 7W | 7D | 14D | 7Dry & 7W |
| Example 2A[1] | 3600 | 5200 | 3900 | 580 | 390 | 440 | 590 | 720 | 360 |
| Example 2B[1] | 3800 | 5400 | 4200 | 340 | 420 | 250 | 670 | 940 | 500 |
| Example 1[1] | 3700 | 5100 | 3800 | 630 | 740 | 490 | 710 | 800 | 580 |
| Example 2C[1] | 3700 | 5100 | 3400 | 470 | 570 | 360 | 630 | 880 | 610 |
| Comp. Acrylic Copolymer | 3000 | 4400 | 3000 | 520 | 670 | 260 | 600 | 770 | 450 |

Footnote:
[1]composition of 5% soluble polymer (all have 95% core of 57 BA 41.5 MMA/1.5 MAA):
Example 2A[1] - 60 MMA/15 MMA/25 HEMA;
Example 2B[1] - 60 MMA/25 MAA/15 HEMA;
Example 1[1] - 70 MMA/15 MMA/15 HEMA;
Example 2C[1] - 35 BA/35 MMA/15 HEMA/15 MAA.

The MFFTs of these latexes as measured by equipment described by Protzman and Brown (J. Appl. Polymer Sci. 4,81 (1960) are given in Table 2.

TABLE 2

| MFFT's of Latexes Used in Table 1 | |
|---|---|
| LATEX | MFFT (°C.) |
| Example 2 (A) | 12 |
| Example 2 (B) | 10 |
| Example 1 | 9 |
| Example 2 (C) | 2 |
| Comparative Acrylic Copolymer | 15 |

Although Example 1 had a lower MFFT than the comparative commercial acrylic copolymer cement modifier (9 versus 15° C., Table 2) allowing it to be used at lower curing temperatures, Example 1 gave better adhesion to old cement (shearbond adhesion, Table 1) and strength (tensile strength, Table 1) as well as better compressive strength than the commercial latex.

To demonstrate the performance of multi-stage polymers of this invention at lower ambient temperatures, samples were cured for 7 days in a refrigerator at 40° F. (~4.4° C.), i.e. well below the MFFT of the commercial acrylic copolymer and slightly below the MFFT of Example 1. The results obtained are given in Table 3.

TABLE 3

Dependence of Cement Mortar Properties on Cure Temperature

| Examples | Shearbonds (psi) | | Tensile Strength (psi) | |
|---|---|---|---|---|
| | 70° F. | 40° F. | 70° F. | 40° F. |
| Example 1 | 560 | 270 | 700 | 560 |
| Comparative Acrylic Copolymer | 525 | 185 | 620 | 485 |

Lowering the cure temperature degraded the adhesion and strength of the commercial acrylic more than it did for Example 1.

Example 4

Example 1 was repeated except that ME #1 contained 60.7% butyl acrylate, 37.8% methyl methacrylate and 1.5% methacrylic acid. That initial copolymer was designated the core and is Example 4A. To that latex was added an alkali-soluble resin of the same composition as ME #2 in Example 1, i.e., 70 MMA/15 MAA/15HEMA, and that is Example 4B.

Example 4C was the multi-stage soluble and insoluble polymer made by the process of Example 1.

Example 4D was the copolymerized uniform composition 57.7 BA/39.4 MMA/2.8 MAA/0.75 HEMA.

The results obtained when a cement mortar was made employing the above examples are given in Table 4.

TABLE 4

Effect of Method of Polymerization on Mortar Performance

| Example | Polymerization Mode | Compression Strength (psi, 24 hr.) | Shearbond (psi, 7 Day) | Tensile Strength (psi, 7 Day) |
|---|---|---|---|---|
| 4A | Insoluble Polymer | 1365 | 470 | 600 |
| 4B | Insoluble & ASR (Blend) | 1315 | 490 | 630 |
| 4C | Insoluble-Soluble Poly | 2150 | 595 | 740 |
| 4D | Copolymerized | 1545 | 455 | 550 |

In all instances, the method of polymerization used in Example 1, i.e., 4C gave improved performance in compression strength, shearbond adhesion and tensile strength over like compositions prepared by another method.

TABLE 5

Effect of Absence of HEMA in Soluble Polymer on Mortar Properties

| Example | Polymerization Mode | Soluble Polymer** Composition | Shearbond (psi, 14 days) |
|---|---|---|---|
| 5A | Insoluble* | None | 290 |
| 5B | Insoluble-Soluble Polymer | 75 MMA/25 MAA | 230 |

When multi-stage polymers without HEMA were used as cementitious modifiers, shearbond adhesion was significantly less than for a similar composition having the ionically-soluble polymer composition incorporating HEMA. In Table 5, when the insoluble polymer was modified with a soluble polymer containing MAA only as the hydrophilic monomer, performance was not improved.

TEST PROCEDURES

Compressive Strength

To measure compressive strength, 2 inch cube specimens were cast and conditioned under specified conditions, e.g., 7 days in a constant 75° F. temperature, constant 50% humidity room (7D) or that condition followed by 7 days under water in a pail (7D & 7W). After conditioning, a specimen was placed on a Tinius-Olsen Super L Tester in a compression mode according to ASTM C-109-73 specifications and a load was applied at a uniform rate until failure occurred.

Shearbond

To measure the adhesion properties of cement mortars, a test developed in our laboratories was used. Two 2 inch ×2 inch×0.5 inch polymer modified mortar patches were cast onto a 6 inch×4 inch×1 inch cured unmodified concrete base piece. After curing in our constant temperature, constant humidity room, the samples were mounted on a test machine, and a shearing load was placed on the 2 inch×0.5 inch face at a steady rate until failure occurred. The shear bond adhesion strength was calculated by dividing the load at failure by the interfacial area of the patch (4 square inches).

Tensile Strength

Briquette (dogbone shaped) specimens were cast in brass molds and conditioned in our constant temperature, constant humidity room. After conditioning, tensile strength was measured on the Tinius-Olsen tester according to ASTM C-190-72 specifications.

Minimum Film Formation Temperature (MFFT)

The minimum film formation temperature is the temperature above which a polymer latex forms a continous film. The MFFT was measured by equipment described by Protzman and Brown (J. Appl. Polymer Sci., 4 81 (1960)). The apparatus essentially was an aluminum slab in which a constant uniform temperature gradient was maintained. A latex to be measured was spread uniformly in one of several sample channels. The temperature at which the film just becomes discontinuous when dry was recorded as the MFFT.

We claim:

1. A multi-stage polymer composition produced by a two-stage sequential aqueous emulsion polymerization method comprising:
   a) forming in a first stage a mixture of monomers comprising from about 90 to about 100 percent of an alkyl acrylate or methacrylate and from about 0 to 10 percent of a carboxylic acid,
   b) polymerizing the mixture to form the insoluble polymer,
   c) forming in a second stage a mixture of monomers comprising from about 40 to 80 percent of an alkyl acrylate or methacrylate and from about 5 to 60 percent of a carboxylic acid and from about 5 to 60 percent of a hydroxyalkyl ester of a carboxylic acid,
   d) adding the second-stage monomers mixture to the polymerized first stage monomers, and
   e) polymerizing the second stage monomers to form a soluble polymer wherein the weight ratio of the insoluble polymer is from about 90-99 and the weight ratio of the soluble polymer is from about 1-10 as a percentage of the final polymer.

2. The composition of claim 1 wherein the insoluble polymer has an average molecular weight of greater than about 100,000 and the soluble polymer has an average molecular weight of about 2,500 to about 12,000 as determined by gel permeation chromatography.

3. The composition of claim 2 wherein the Tg of the soluble polymer is greater than 30 degrees Centigrade and the Tg of the insoluble is from about −45 (minus) degrees Centigrade to about +30 (plus) degrees Centigrade and a minimum film forming temperature MFFT of from about 0 degrees Centigrade to about 30 degrees Centigrade.

4. The composition of claim 1 wherein the mixture of monomers comprising the soluble and the insoluble polymer is selected from the group consisting of methyl acrylate, ethyl acrylate, butyl acrylate, 2-ethylhexyl acrylate, decyl acrylate, methyl methacrylate, ethyl methacrylate, hydroxyethyl methacrylate, hydroxypropyl acrylate, hydroxypropyl methacrylate, butyl acrylate, acrylonitrile, acrylic acid, methacrylic acid, itaconic acid, maleic acid, fumaric acid, acrylic anhydride, methacrylic anhydride, methylolated acrylamide and methylolated methacrylamide, methacrylamide, acrylamide, divinyl benzene, half esters of maleic, itaconic anhydride, fumaric anhydride, styrene, substituted styrene, vinyl acetate and other $C_1$–$C_{12}$ alkyl acrylates and methacrylates.

5. The composition of claim 4 wherein the mixture of monomers comprising the soluble polymer are from about 50 to about 90 percent of an alkyl acrylate or methacrylate and from about 5 to about 25 percent of a carboxylic acid and from about 5 to about 25 percent of a hydroxyalkyl ester of a carboxylic acid, based on the weight of the soluble polymer.

6. The composition of claim 5 wherein the mixture of monomers comprising the soluble polymer are methylmethacrylate, methacrylic acid, and hydroxyethyl methacrylate.

7. The composition of claim 4 wherein the mixture of monomers comprising the insoluble polymer are from about 90 to about 100 percent of an alkyl acrylate or methacrylate and from about 0 to 10 percent of a carboxylic acid.

8. The composition of claim 7 wherein the mixture of monomers comprising the insoluble polymer are butyl acrylate and methylmethacrylate, and methacrylic acid.

9. A composition as in of claim 1 comprising a multi-stage polymer having an alkali-insoluble emulsion polymer and an alkali-soluble emulsion polymer wherein the insoluble polymer and the soluble polymer are prepared sequentially by an emulsion polymerization process.

10. A multi-stage polymer as in of claim 1 comprising a multi-stage polymer having an alkali-insoluble emulsion polymer and an alkali-soluble polymer wherein the insoluble and the soluble polymers are prepared sequentially by an emulsion polymerization process.

* * * * *